Sept. 4, 1934.   W. BARRETT   1,972,641
POCKET GOPHER TRAP

Filed July 8, 1933

Inventor
William Barrett
Lynn H. Latta

By

Attorney

Patented Sept. 4, 1934

1,972,641

UNITED STATES PATENT OFFICE 1,972,641

POCKET GOPHER TRAP

William Barrett, Sioux City, Iowa

Application July 8, 1933, Serial No. 679,526

4 Claims. (Cl. 43—80)

My invention relates to a trap specifically intended for trapping gophers.

An object of my invention is to provide a trap which will positively ensnare the gopher when the animal approaches the surface.

Another object of my invention is to make use of the natural instinct of gophers to enable one to trap the rodents.

A further object of my invention is to provide a trap of such a mechanism which will insure the catch of the animal with a subsequent immediate killing.

A further object of my invention is to accomplish the above mentioned objects in a construction which is simple and easy of manufacture.

With these and other objects in view, my invention consists in the construction, arrangement and combination of the various parts of my device, whereby the objects contemplated are attained, as hereinafter more fully set forth, pointed out in my claims, and illustrated in the accompanying drawing, in which:

Figure 1:
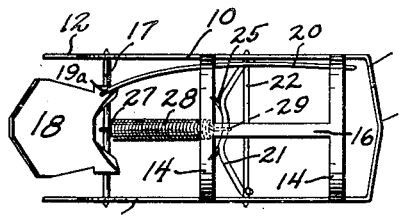
Figure 1 is a plan view of the trap before setting.

I have used the character 10 to indicate generally the framework of the trap. This framework comprises the generally U-shaped member 11, which includes the members 12 and the end member 13, which is slightly indented as shown.

The framework 10 also includes the further substantially U-shaped members 14, which are arced in their upper portions.

Cross members 15 serve to brace an arrangement as shown, and the further horizontal member 16 is provided for the same purpose.

All of these members are joined together in any suitable manner known in the art.

Received between the members 12 is the bar 17, about which is pivoted the thin plate 18 by means of the integral ear members 19.

Pivotally attached to the plate 18 at 19a is the tripping lever 20.

The spring urged jaw 21 is secured to the bar 22, which is journalled within the members 12 at the points 23.

Figures 7, 8:
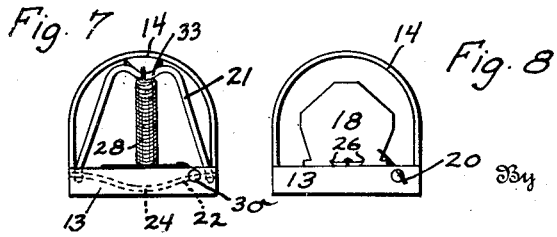
Figure 7 is a rear view of Figure 1.
Figure 8 is a rear view of Figure 2.

The bar 22 is shaped as shown in Figure 7 and includes the depressed portion 24.

The jaw 21 includes the horn-shaped member 25, which terminates in the sharp points 26.

The member 25 is welded or soldered to the jaw 21.

Secured at the center of the bar 17 at 27 is the strong spring 28. The other end of the spring 28 is secured at 29 to the center of the jaw 21.

The jaw 21 is shaped substantially as shown. The member 13 of the frame includes an opening 30, which is adapted to receive the end of the trip lever 20.

Figure 2:
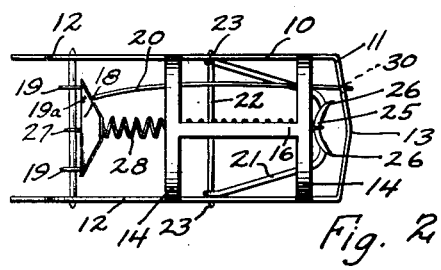
Figure 2 is a plan view of the trap after setting.
Figure 3:
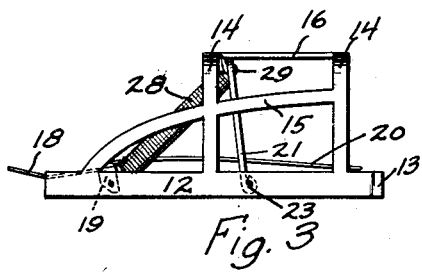
Figure 3 is a side elevation of Figure 1.
Figure 4:
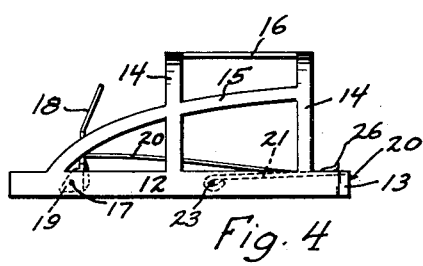
Figure 4 is a side elevation of Figure 2.

In setting the trap the jaw 21 is forced to its horizontal position as shown in Figures 2 and 4. The lever 20 is inserted in the opening 30, bringing the plate 18 to approximately a vertical position as shown in Figure 4.

The plate 18 is slightly bent as shown. By virtue of the engagement of the lever 20 in the opening 30, the jaw 21 will be retained in its horizontal position with the maximum amount of tension applied to the jaw through the spring 28.

The pocket gopher instinctively seeks the opening to the gopher hole when inside to fill the opening with dirt. The dirt is carried by the animal upwardly along the incline of the tunnel, which is indicated by the character 31 in Figures 5 and 6.

Figure 5:
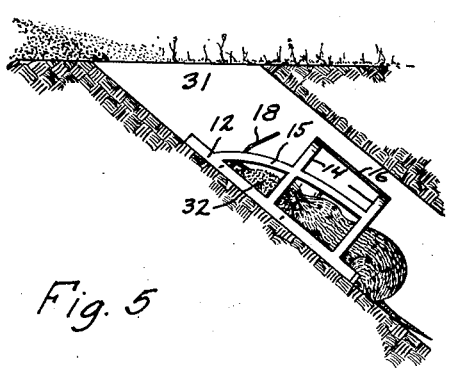
Figure 5 is a general view showing the pocket gopher about to be trapped.

Figure 5 shows the animal already entering the trap.

It will be seen that the trap nearly fills the hole so that the animal will be compelled to pass therethrough in his passage upwardly.

As shown in Figure 5 the animal is carrying a small mass of earth 32. The earth is in front of the animal and is against the plate 18.

As soon as the animal pushes further upwardly, the plate 18 will be forced rearwardly, carrying the trip lever 20 with it. The trip lever 20 will be released from the opening 30 and the spring urged jaw 21 will be thrown upwardly.

In the position shown in Figure 5, the animal will be entering the trap approximately as shown with its four legs straddling the spring 28.

Figure 6:
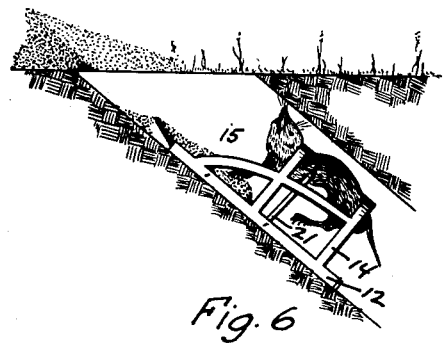
Figure 6 is a similar view showing the gopher already trapped.

As soon as the trap is sprung, the jaw will carry the animal upwardly as shown in Figure 6 when the points 26 will penetrate into the body of the animal, and the body of the animal being soft will tend to split and take the position approximately as shown with the firm pressure being exerted against the junction of the member 16 and the forward U-shaped member 14.

The animal will be thus securely trapped and practically instantly killed.

The trap is usually made approximately three inches in width with approximately a similar height, and I have found by carefully fixing the distance between the prongs 26 and the bar 17 at about six inches, that the best effect is secured as far as proportional size of the animals is concerned.

In this way by fixing the sizes, the animal is securely entrapped at the proper points regardless of the difference in size.

It will be seen in Figure 7 that due to the shape of the bar 22 at 24, that when the jaw 21 is brought to its horizontal position the depression 24 will be as shown in this figure. This will allow the spring 28 to be received within this depression so that it will lie flat; in other words the bar 22 moves with the jaw 21.

The position of the depression 24 is shown slightly out of position in Figure 7 with respect to the jaw 21 to show this feature more clearly.

It will be noted that the upper part of the jaw 21 includes the bent portion 33, which is adapted to follow the contour of the horn-shaped member 25. This portion also receives part of the body of the animal to cause a firm gripping effect, to cause a positive retention of the animal therein.

The pivotal connection 19 is made by simply bending back a pair of integral ears on the plate 18 as shown.

It will now be seen that I have devised a pocket gopher trap which will positively trap the gopher when it approaches the surface.

It will also be seen that my invention takes advantage of the natural instinct of gophers to fill up an opening above them.

It will be seen further that the trap is positive in action and that it is simple in construction.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A pocket gopher trap comprising a frame including a U-shaped base having an opening in its inner end, a spring urged jaw positioned horizontally within the base and pivotally mounted therein, a trip plate pivotally mounted at the outer end of the base, a trip lever pivotally secured to the plate and adapted to be received within the opening to retain the jaw, and to allow closing of the jaw when the trip plate is forced outwardly causing the trip lever to be drawn out of the said opening.

2. A pocket gopher trap comprising a frame including a U-shaped base having an opening in its inner end, a spring urged jaw positioned horizontally within the base and pivotally mounted therein, a trip plate pivotally mounted at the outer end of the base, a trip lever pivotally secured to the plate and adapted to be received within the opening to retain the jaw, and to allow closing of the jaw when the trip plate is forced outwardly causing the trip lever to be drawn out of the said opening, said jaw including an arced member having a pair of sharp points adapted to pierce an animal's body when the jaw is sprung, a framework attached to the base and extending thereabove, said framework including a pair of upstanding arcuate members including a top cross bar attached therebetween against which the jaw bears when sprung.

3. A pocket gopher trap comprising a frame including a U-shaped base having an opening in its inner end, a spring urged jaw positioned horizontally within the base and pivotally mounted therein, a trip plate pivotally mounted at the outer end of the base, a trip lever pivotally secured to the plate and adapted to be received within the opening to retain the jaw, and to allow closing of the jaw when the trip plate is forced outwardly causing the trip lever to be drawn out of the said opening, said jaw including an arced member positioned transversely of the frame having a pair of sharp points adapted to pierce an animal's body when the jaw is sprung, and an arcuate framework attached to the base and extending thereabove, said framework including an outer frame against which the body of the animal is compressed by the jaw.

4. A pocket gopher trap comprising a frame including a U-shaped base having an opening in its inner end, a jaw having a pair of piercing points positioned horizontally within the base and pivotally mounted therein, a bar secured across the outer end of the base, a spring attached to the bar and the jaw, a trip plate pivotally mounted on the bar, a trip lever secured to the plate and adapted to be received within the opening to retain the jaw, and to allow closing of the jaw upwardly when the trip plate is forced outwardly causing the trip lever to be drawn out of the opening, and an arcuate framework attached to the base and extending thereabove arranged to substantially fill a gopher hole, said framework including an outer member against which the body of the animal is compressed by the jaw.

WILLIAM BARRETT.